Oct. 13, 1959   W. A. LINDBLOOM   2,908,764
TOLL BOARD
Filed July 2, 1956   11 Sheets-Sheet 1

INVENTOR.
WILLIAM A. LINDBLOOM
BY
ATTY.

Oct. 13, 1959.  W. A. LINDBLOOM  2,908,764
TOLL BOARD
Filed July 2, 1956  11 Sheets-Sheet 2

INVENTOR.
WILLIAM A. LINDBLOOM
BY
ATTY.

INVENTOR.
WILLIAM A. LINDBLOOM
BY
ATTY.

Oct. 13, 1959    W. A. LINDBLOOM    2,908,764
TOLL BOARD
Filed July 2, 1956    11 Sheets-Sheet 4
FIG. 3A
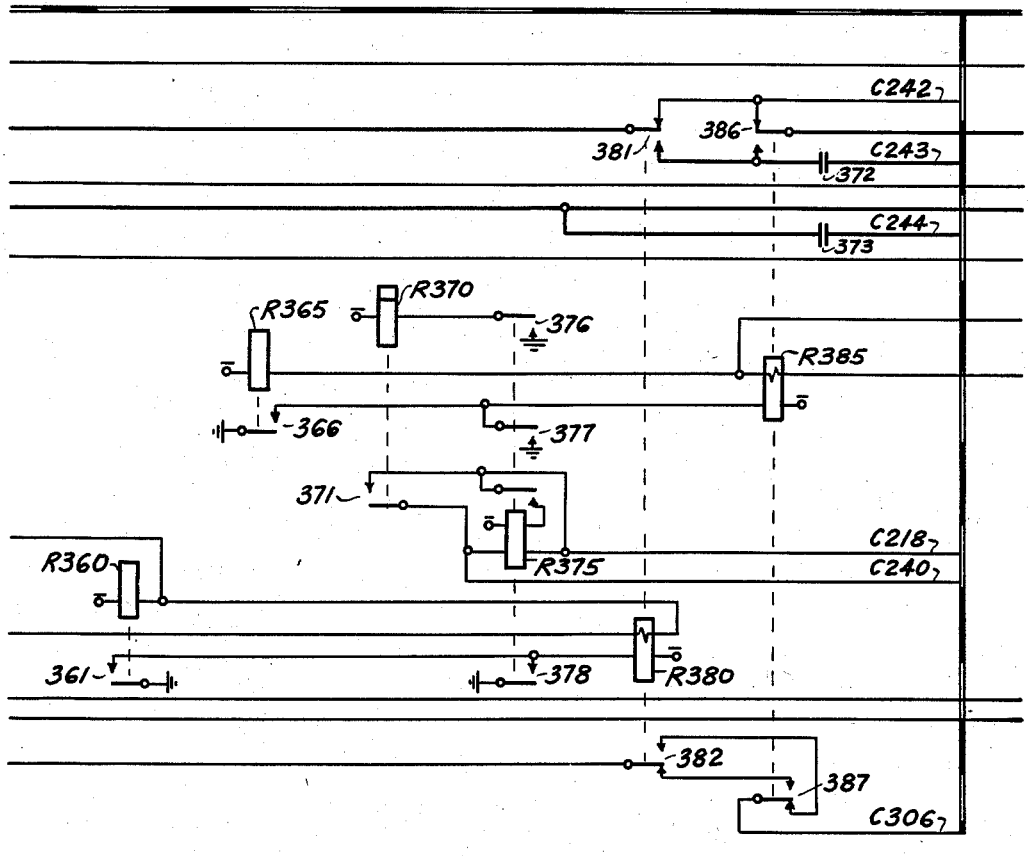
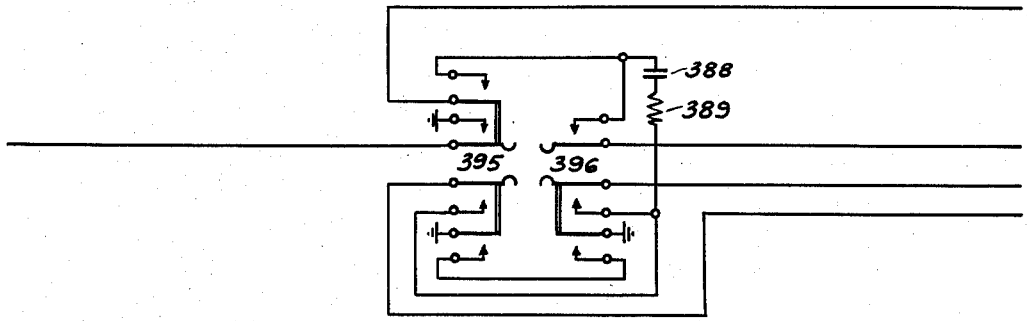
INVENTOR.
WILLIAM A. LINDBLOOM
BY
ATTY.

Oct. 13, 1959  W. A. LINDBLOOM  2,908,764
TOLL BOARD
Filed July 2, 1956  11 Sheets-Sheet 5

INVENTOR.
WILLIAM A. LINDBLOOM
BY
ATTY.

SENDER CONTROL 600

Oct. 13, 1959    W. A. LINDBLOOM    2,908,764
TOLL BOARD
Filed July 2, 1956    11 Sheets-Sheet 9

INVENTOR.
WILLIAM A. LINDBLOOM
BY
ATTY.

Oct. 13, 1959    W. A. LINDBLOOM    2,908,764
TOLL BOARD

Filed July 2, 1956    11 Sheets-Sheet 10

INVENTOR.
WILLIAM A. LINDBLOOM
BY
ATTY.

Oct. 13, 1959 W. A. LINDBLOOM 2,908,764
TOLL BOARD
Filed July 2, 1956 11 Sheets-Sheet 11

INVENTOR.
WILLIAM A. LINDBLOOM
BY
ATTY.

United States Patent Office 2,908,764
Patented Oct. 13, 1959

2,908,764

TOLL BOARD

William A. Lindbloom, Franklin Park, Ill., assignor to General Telephone Laboratories, Incorporated, a corporation of Delaware Application July 2, 1956, Serial No. 595,316

5 Claims. (Cl. 179—27)

This invention relates to telephone systems and specifically to toll switchboards which are to control equipment at a distant exchange where the distant exchange in question may require direct current pulses or multi-frequency pulses.

Simply put, the operator at a toll board, on notice of a call to a distant exchange, connects to a direct trunk to that exchange. The distant exchange may be one of the Strowger or step-by-step type requiring interrupted direct current pulses or may be of the cross-bar or panel type system requiring multi-frequency pulses. The question as to which of these types of pulses the distant exchange requires, does not concern the operator at all. The operator connects to the desired trunk and from a common pool of senders a sender is automatically selected, seized and connected through the circuits under the operator's control to the trunk. The sender which has been selected, automatically is one of the type required by the distant exchange. This selection process is completely independent of the operator, once the initial trunk connection has been made.

The invention has as its objects a method of providing the automatic connection of a sender equipped to provide pulses of the required type in response to a signal originated in the trunk over which the pulses are to be sent.

Another object of the invention is to provide a common pool of senders, the pool having both direct current and multi-frequency impulse senders, any of which may be accessed from a sender control circuit. When a sender of one type is being sought, the senders of the other type are blanked out of the searching and selection process. In this manner, a sender of the type not required cannot be selected.

These and other features of the invention will become apparent when viewed in connection with the drawings.

Figs. 3, 3A and 4 show the operator's position circuit.

Figure 5:
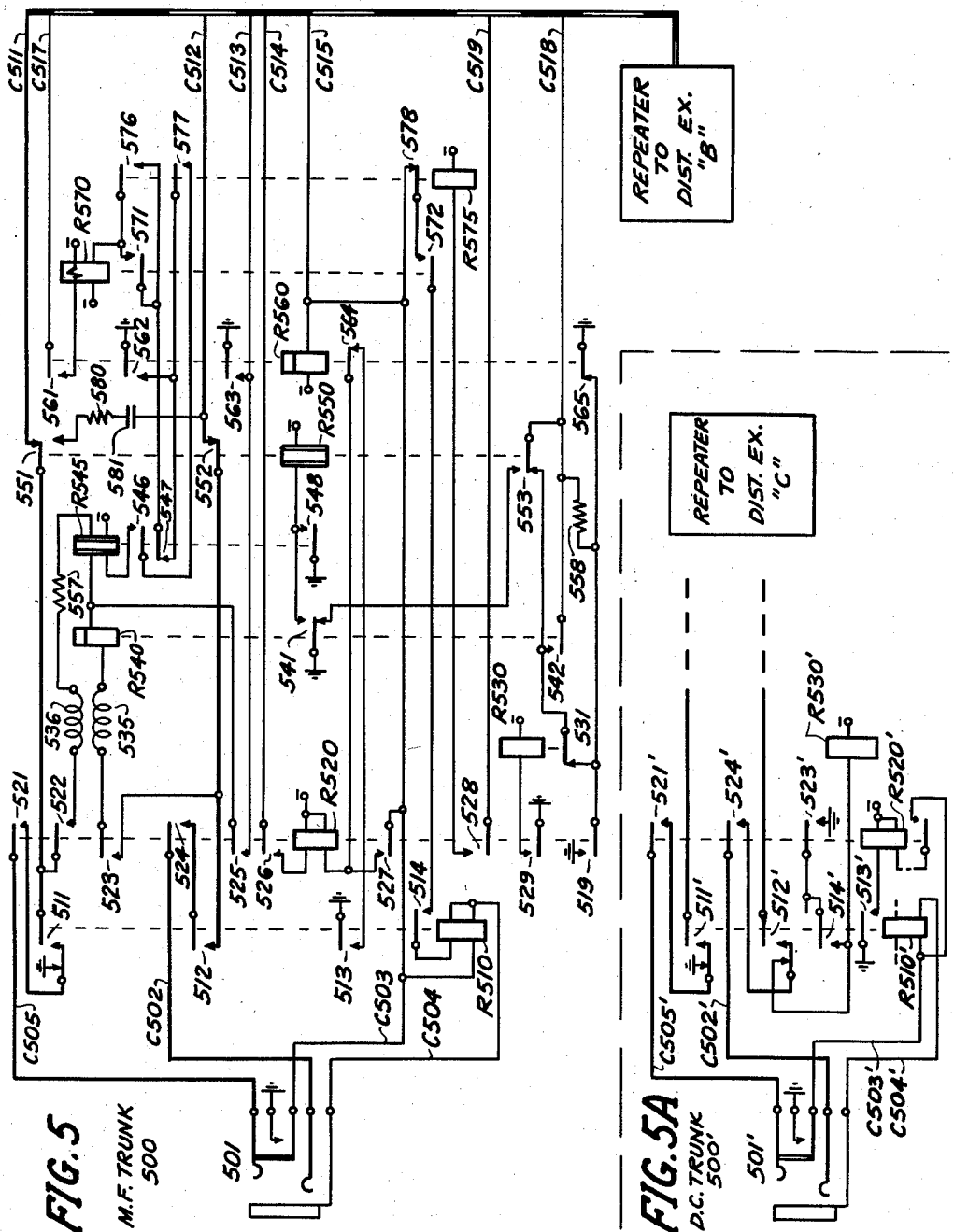

Fig. 5 shows an outgoing trunk arranged for multi-frequency pulsing. Fig. 5A shows the necessary revision in Fig. 5 to equip the trunk for D.C. sending. The relays and contacts of Fig. 5A are shown for trunk 500' as compared with their counterparts in the circuit of trunk 500. The remainder of the relays and their contacts in Fig. 5A have not been shown as they are but duplicates of those in Fig. 5.

Figure 6:
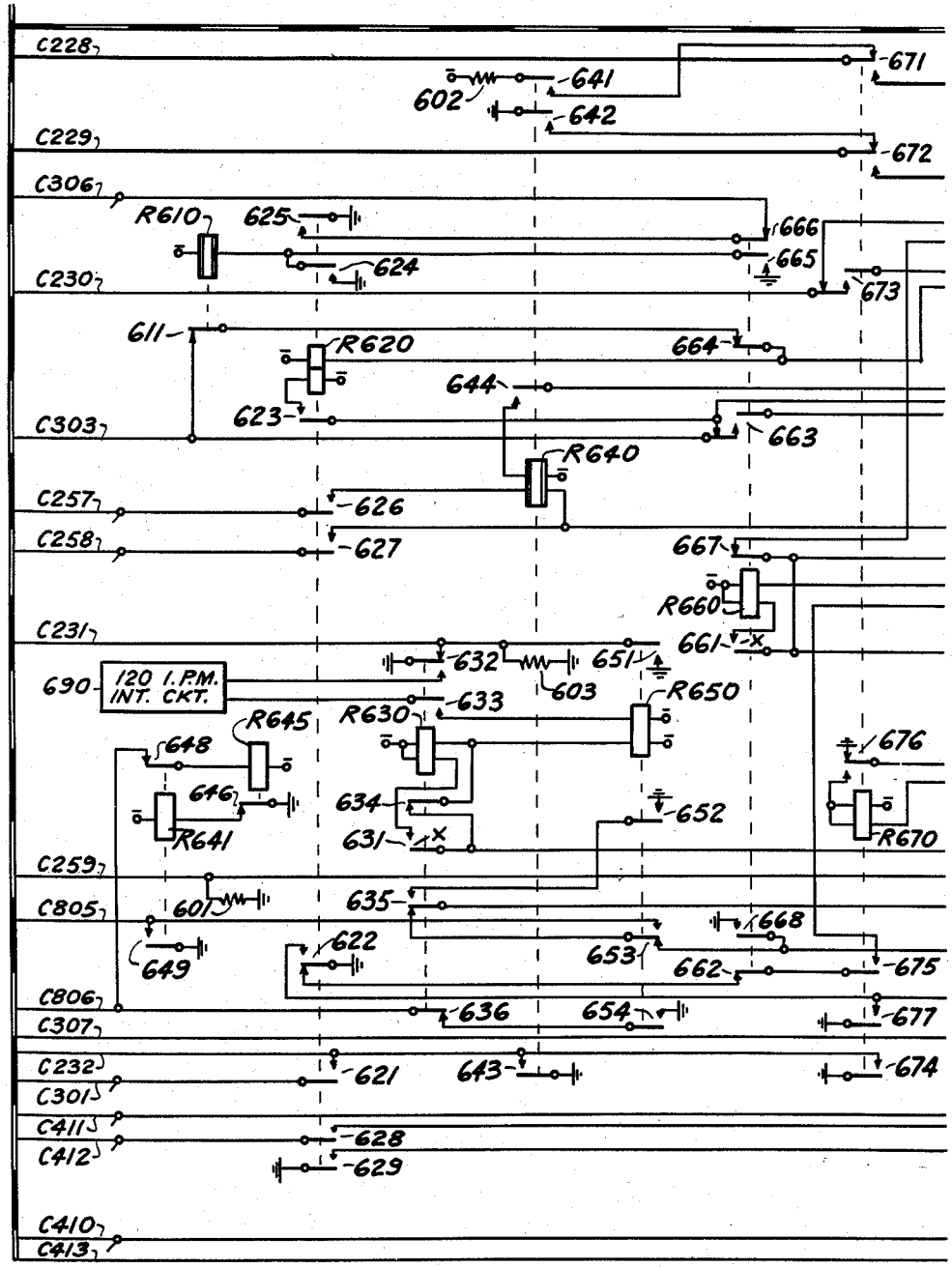
Figure 7:
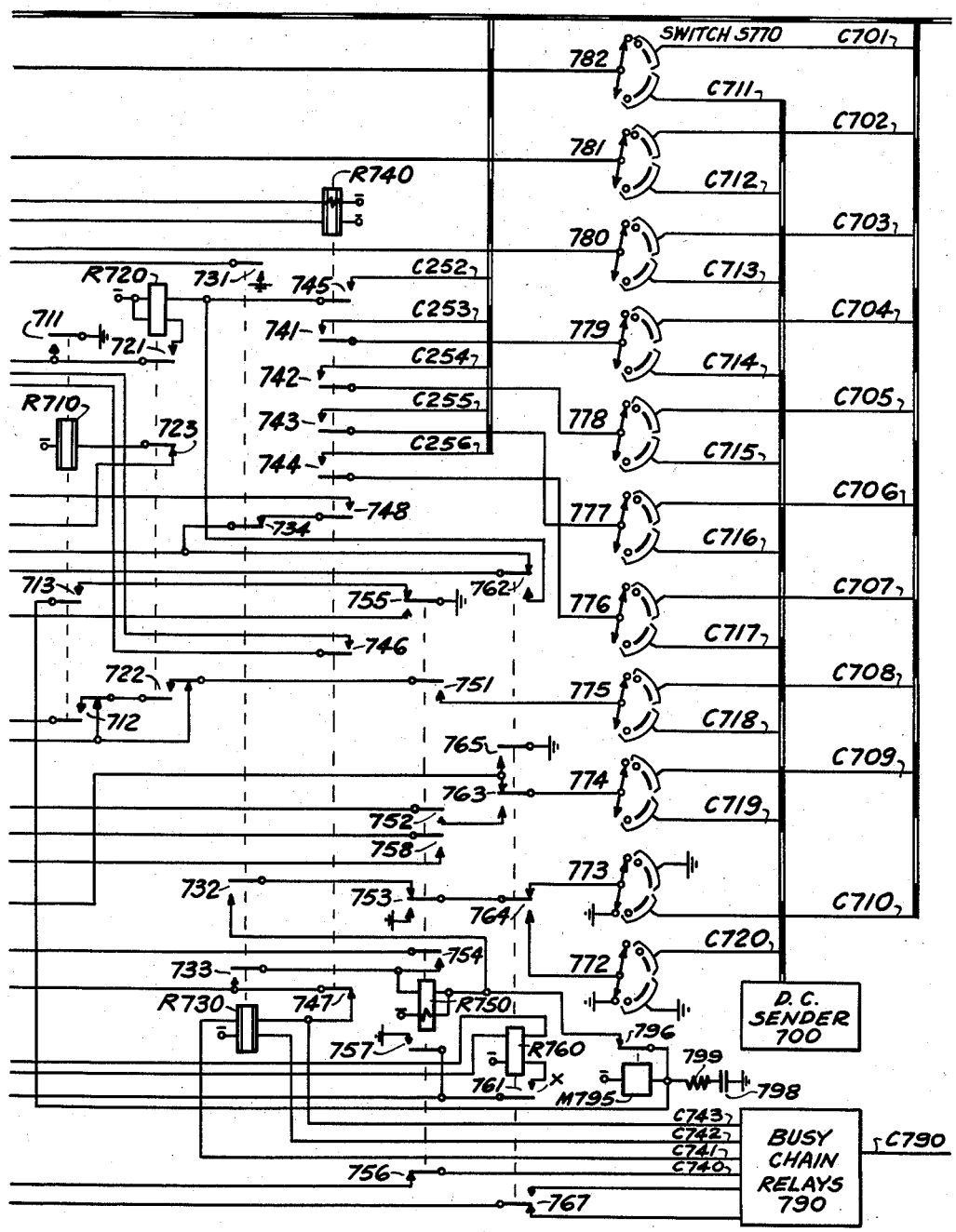

Figs. 6 and 7 show the sender control circuit.

In Fig. 7 is shown (in block form) the direct current sender 700 which is of generally known design.

Figure 8:
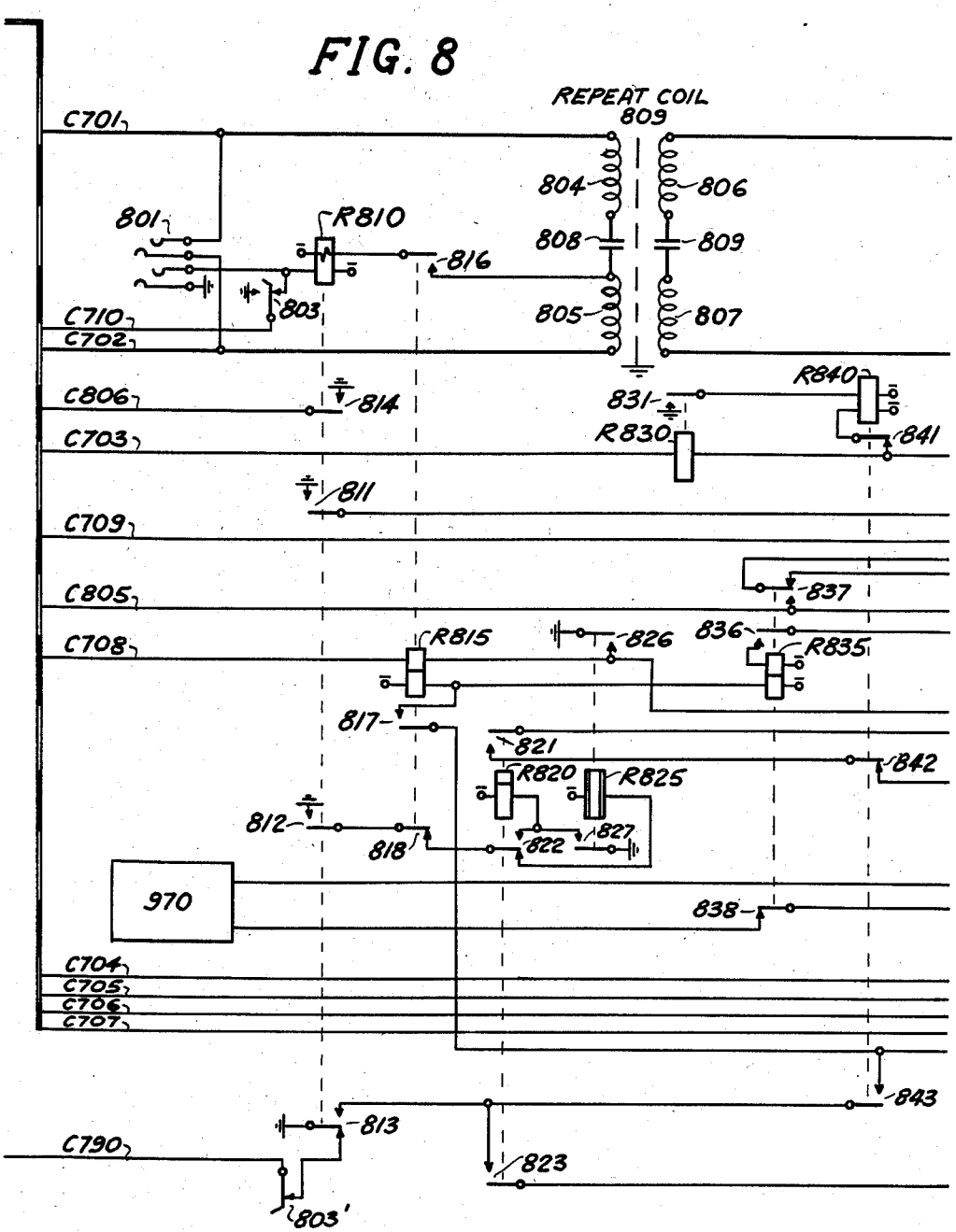
Figure 8A:
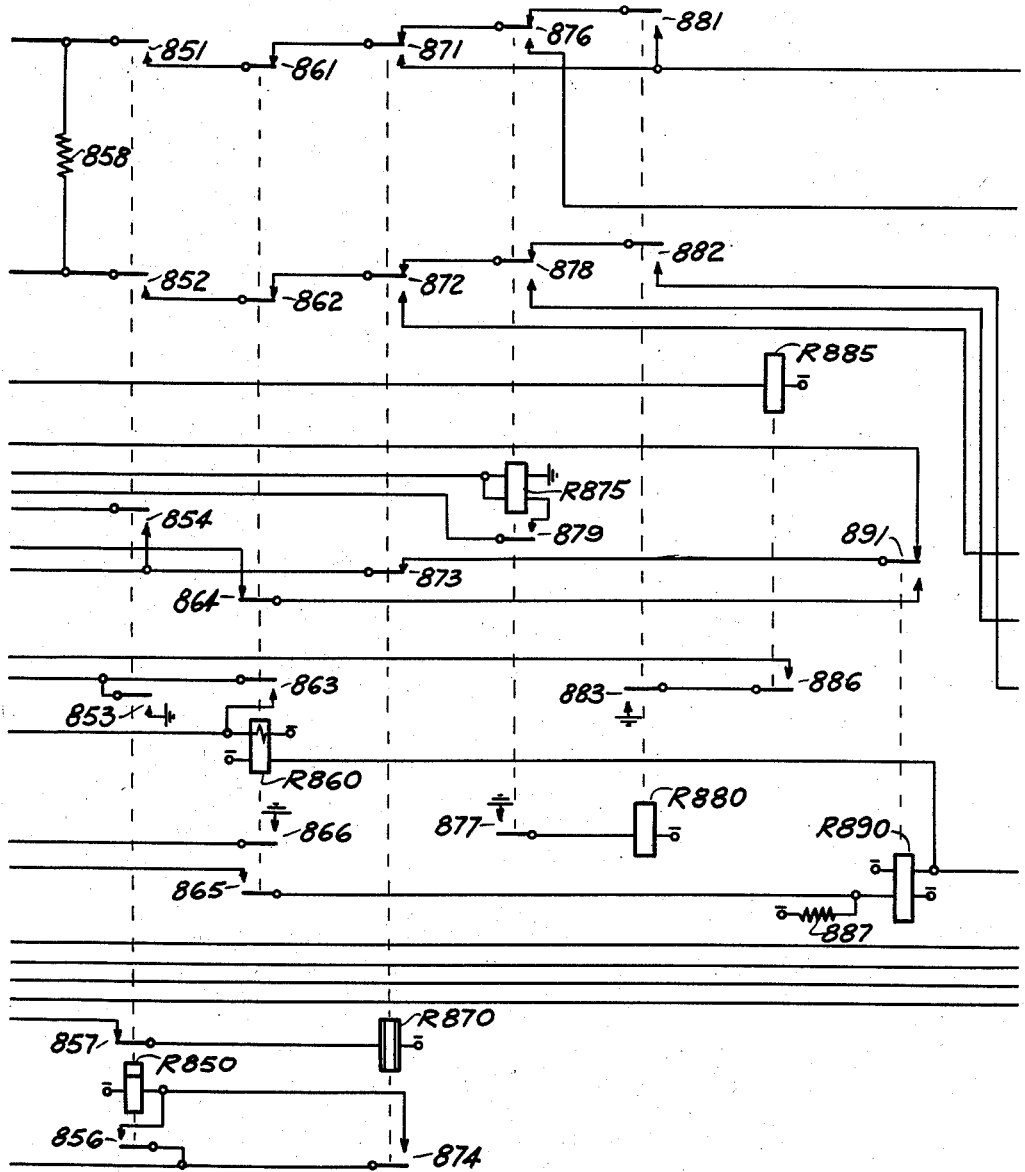
Figure 9:
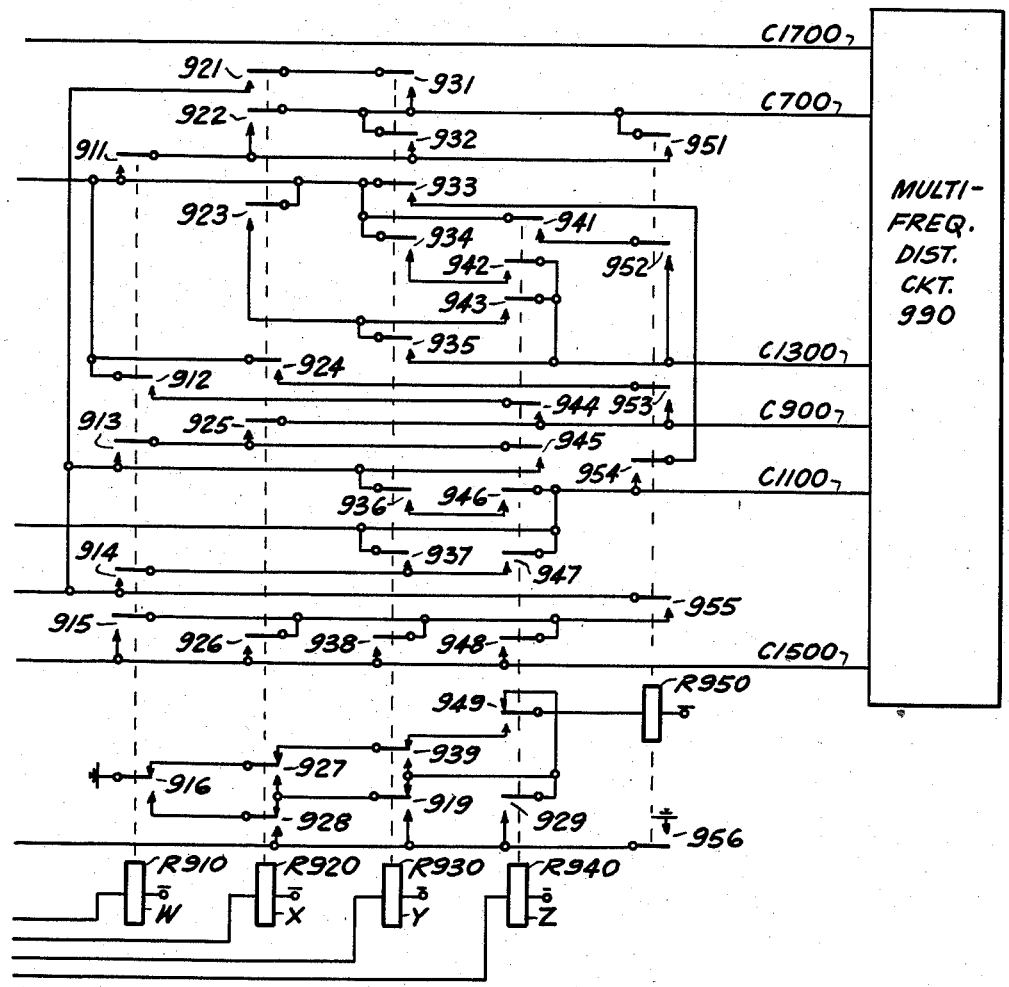

Figs. 8, 8A and 9 show the register sender for providing multi-frequency pulsing.

Figures 1, 1A:
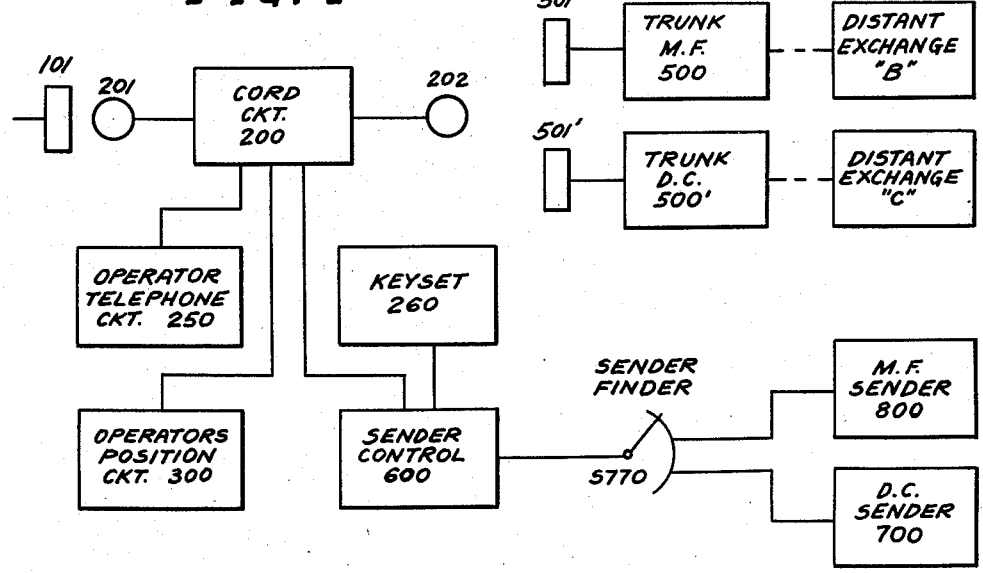
Fig. 1 shows a schematic representation in block form of the circuits of the present invention and those circuits directly in contact with them.
Fig. 1A shows the method of assembling the other figures.
Figure 2:
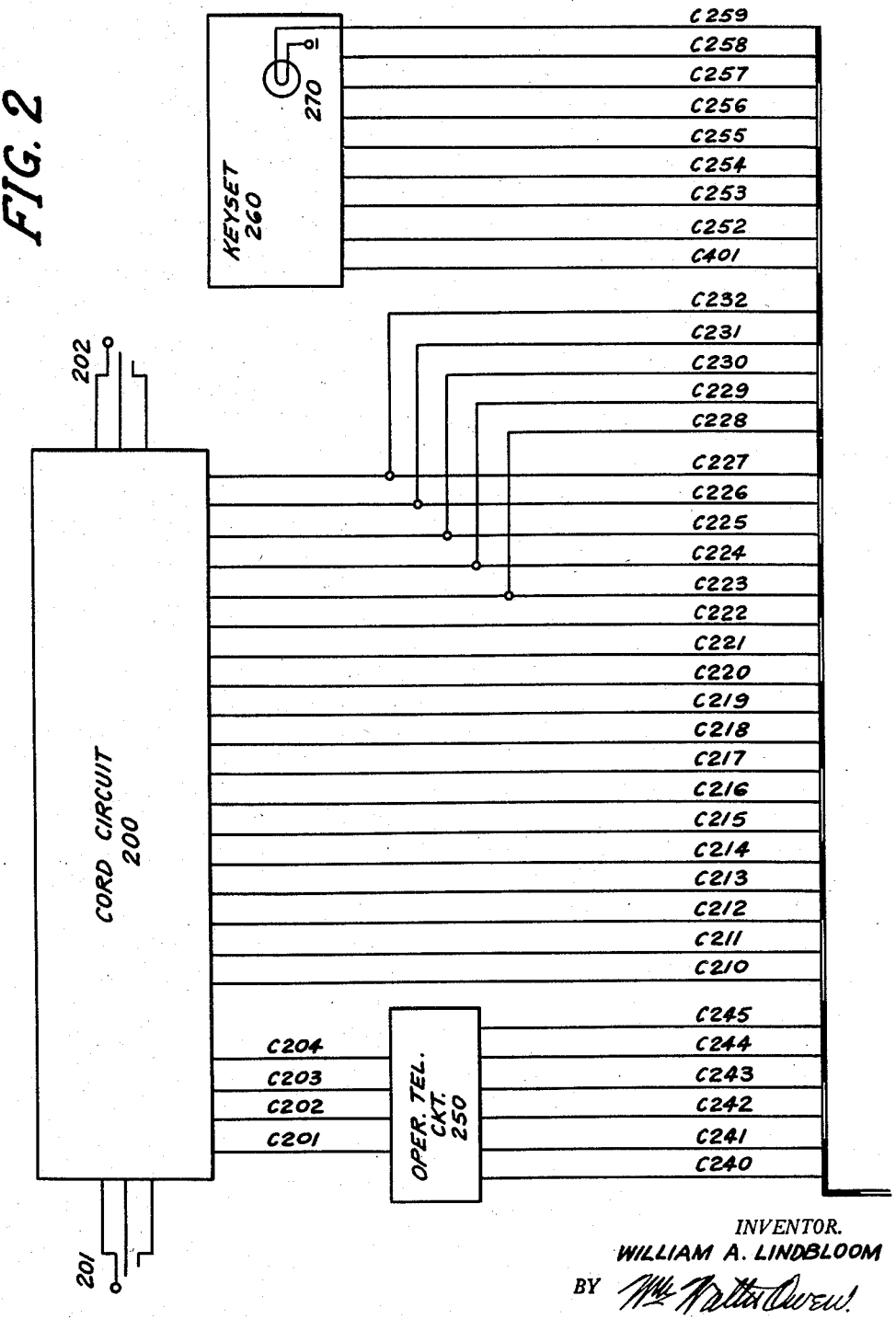
Fig. 2 shows a block diagram of the cord circuit, operator's telephone circuits and keyset.

Fig. 1 shows generally the schematic arrangements necessary to complete a toll call through the circuits of the present invention as applied to a toll board of the general type shown in U.S. Patent 2,511,145 issued June 13, 1950 to H. W. Balzer. For each operator's position there are supplied a number of cord circuits 200 of the type shown in the copending application #443,045 filed July 13, 1954 by W. A. Lindbloom. Also for each position circuit there is a single operator's telephone circuit 250 of generally known design, a single operator's position circuit 300, a single generally known type of keyset 260 and a single sender control circuit 600. The sender control has access through the wipers of sender-finder switch S770 to a common pool of register-senders. The pool consists of multi-frequency senders such as 800 and direct current senders such as 700. Direct current register-senders of this type are known in general and can be seen in the previously mentioned copending application. When plug 202 is inserted in jack 501' to connect to distant exchange "C," an exchange requiring direct current pulsing, the sender finder switch S770 will find an idle direct current sender 700. When plug 202 is inserted in jack 501 for connection to distant exchange "B" requiring multi-frequency pulsing, the sender finder switch will find and seize an idle sender 800. The operator then keys the proper digits on keyset 260 and the digits are transformed in the seized sender to the required form and sent back through the sender control and cord circuits to the trunk and ultimately to the required distant exchange. On completion of the sending of the digits, the sender, sender control and position circuits are released and are therefore ready to handle further calls.

Accepting the call

Figure 3:
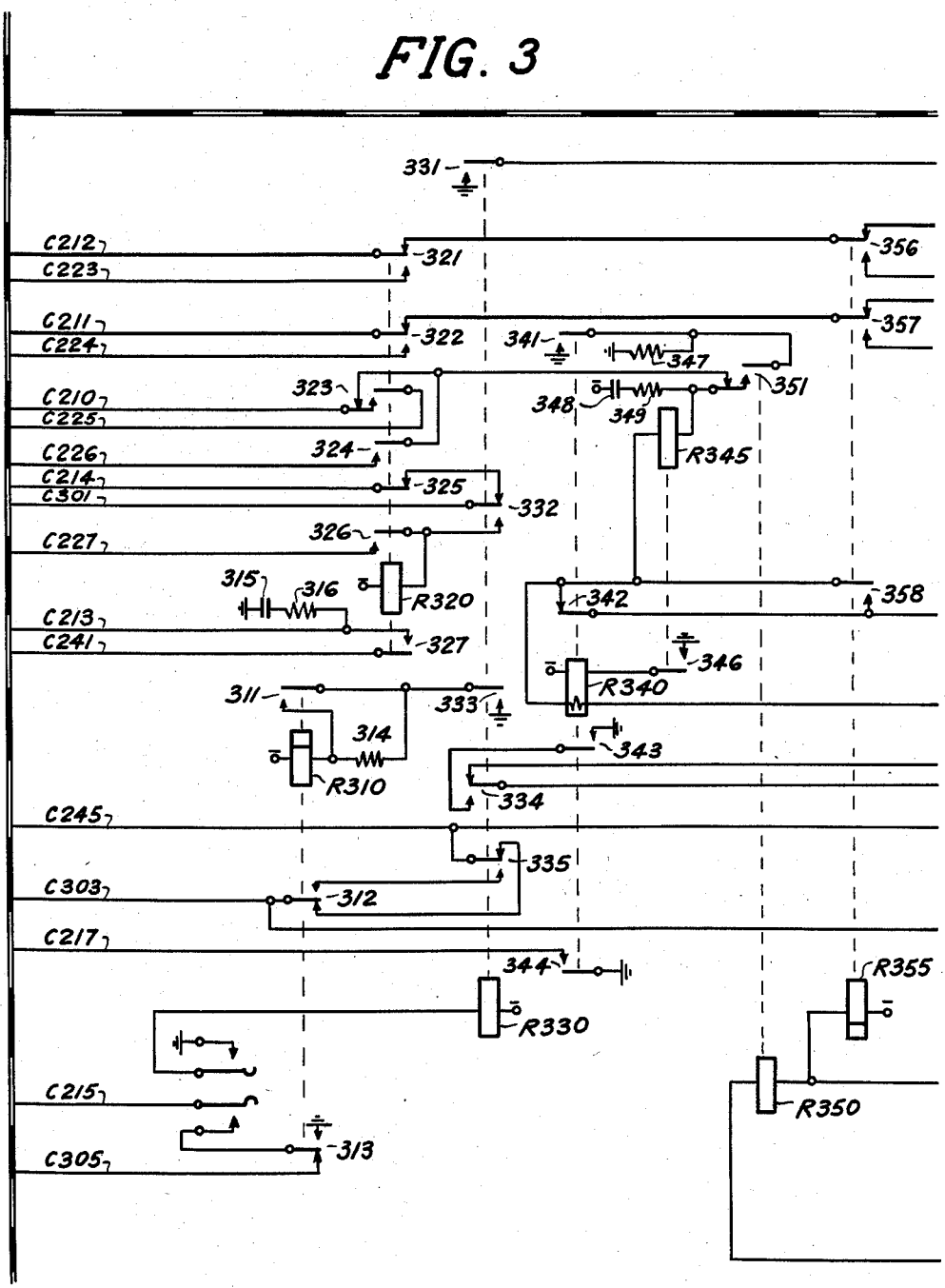

In normal operation, on notice of a call, the operator inserts the rear plug 201 into the jack 101 of the calling line. The cord circuit 200, the operators telephone 250 and the operator's position circuit 300 are thereby seized. Resistance ground is closed from the sleeve lead of the calling line over a path through lead C210, closed contacts 323 and 351 (Fig. 3), relay R345 having a low resistance, contacts 342 and relay R360 to negative battery. The current received by relay R345 is not sufficient to allow it to operate but relay R360 does operate and at its contacts 361, ground is closed to relay R380 and negative battery. Relay R380 operates. At its contacts 381, a transmission path is closed from the calling line over leads C243 and C244 to the operator's telephone circuit 250.

If for some reason the operator were to insert the front plug 202 into the rear jack 101, resistance ground would appear on lead C222 through relay R365 to operate this relay on the path from ground on lead C222, relay R420, contacts 411, relay R365 to negative battery. The circuit resistance is such that relay R420 will not operate at this time but relay R365 will operate. At contacts 366 ground is closed to operate relay R385. In this manner leads C243 and C244 would be connected to the front plug 202 on leads C220 and C221. The practical effects of either connection, front or rear, are identical. For simplicity in the further explanation it will be assumed that relays R360 and R380 are operated at this time, the calling line being connected to the rear cord.

Next, the operators talk key, in cord circuit 200, is depressed causing a number of simultaneous operations. First, battery is closed on lead C218 through relay R375 to ground on lead C240 in the operators telephone circuit 250. This ground on lead C240 indicates that the operators position circuit is idle at that time. Relay R375 operates, closing its contacts 376 to operate relay R370 and closing contacts 378 locking relay R380 operated. At contacts 371 the hold winding of relay R375 is shorted out, thus placing the ground from lead C240 on the switching relay of cord circuit 200 causing the latter relay to lock operated. Lead C240 is opened (in the operator's telephone circuit 250), opening the original operate path of relay R375. Relay R375 releases to open the path to relay R370, which then releases. This sequence of operation attaches the position circuit to the cord circuit in use and marks the position circuit as busy to the other cord circuits by removal of the ground from lead C240.

With the talk key and switching relay of the cord circuit 200 in the operated state, the tip, ring, sleeve and supervisory lamp leads of the front and rear ends of the cord are connected to the position circuit 300 over the respective leads C220, C221, C222 and C219 for the front end and C212, C211, C210 and C217 for the rear end. Also on the operation of the talk key, ground is placed on lead C245, and transmitted through contacts 335 and 312, lead C303, to Fig. 6 contacts 611 and 664 to relay R620 and negative battery. Relay R620 operates and locks its hold winding through contacts 623 and 663 to lead C303 and ground. At contacts 624, ground has been closed to relay R610. Relay R610 operates and at contacts 611 opens the original operate path to relay R620. This action marks the sender control 600 as seized.

The ground on lead C303 is further transmitted through contacts 444 to relay R450 and negative battery. Relay R450 operates and at its contacts 452 closes ground to relay R455. Relay R455 operates thus activating the trunk detection relays of position circuit 300.

Relays operated at this stage include R360 and R380, the switching relay in cord circuit 200, R450, R455, R610 and R620.

*Extending the call to the trunk circuit*

The operator after being informed of the intended destination of the call, assumed to be distant exchange "B," inserts plug 202 into jack 501 of Fig. 5 leading to the trunk 500. Plugging in of the jack closes the ground at jack 501 to lead C503, relay R510, lead C504, cord circuit sleeve lead C222, relay R420, contacts 411, relay R365 to battery. Relay R420 operates and closes ground at contacts 421 to relay R410. Relay R410 operates and at contacts 411 locks out relay R365. Relay R510 also operates on the jack ground and closes ground at its contacts 513 through contacts 564 to relay R520 and battery. Relay R520 operates and locks itself to ground at jack 501 through its contacts 527. At contacts 529, ground is closed to relay R530 and battery. Relay R530 operates. At contacts 531, lead C518 is changed from its normal directly grounded state to the seized or open state. Also the ground at jack 501 on lead C503 has operated relay R560, sending out supervisory signals and all trunks busy signals.

With the lead C518 in its seized state in trunk 500, lead C519 becomes grounded at the distant exchange end of the trunk. This action gives a connect signal to the distant end which returns "off-hook" supervision to delay pulsing until the equipment is ready. Thus as ground immediately appears on lead C519, an operate path is closed to relay R575. Relay 575 operates and closes relay R570 to ground over the following path: battery, relay R570, contacts 576, 547 and 562 to ground. Relay R570 locks operated to ground at 562 through contacts 547 and its own contacts 571.

When the distant end pulsing path is ready, the supervision is changed to "on-hook" as a start pulsing signal. Thus ground is removed from lead C519 causing relay R575 to release. Relay R575 restores and closes the ground at jack 501 on lead C503 through contacts 578, 572, 514 and the upper or low resistance winding of relay R510 through the sleeve lead to light the cord supervisory lamp 270 for "on-hook" supervision.

Figure 4:
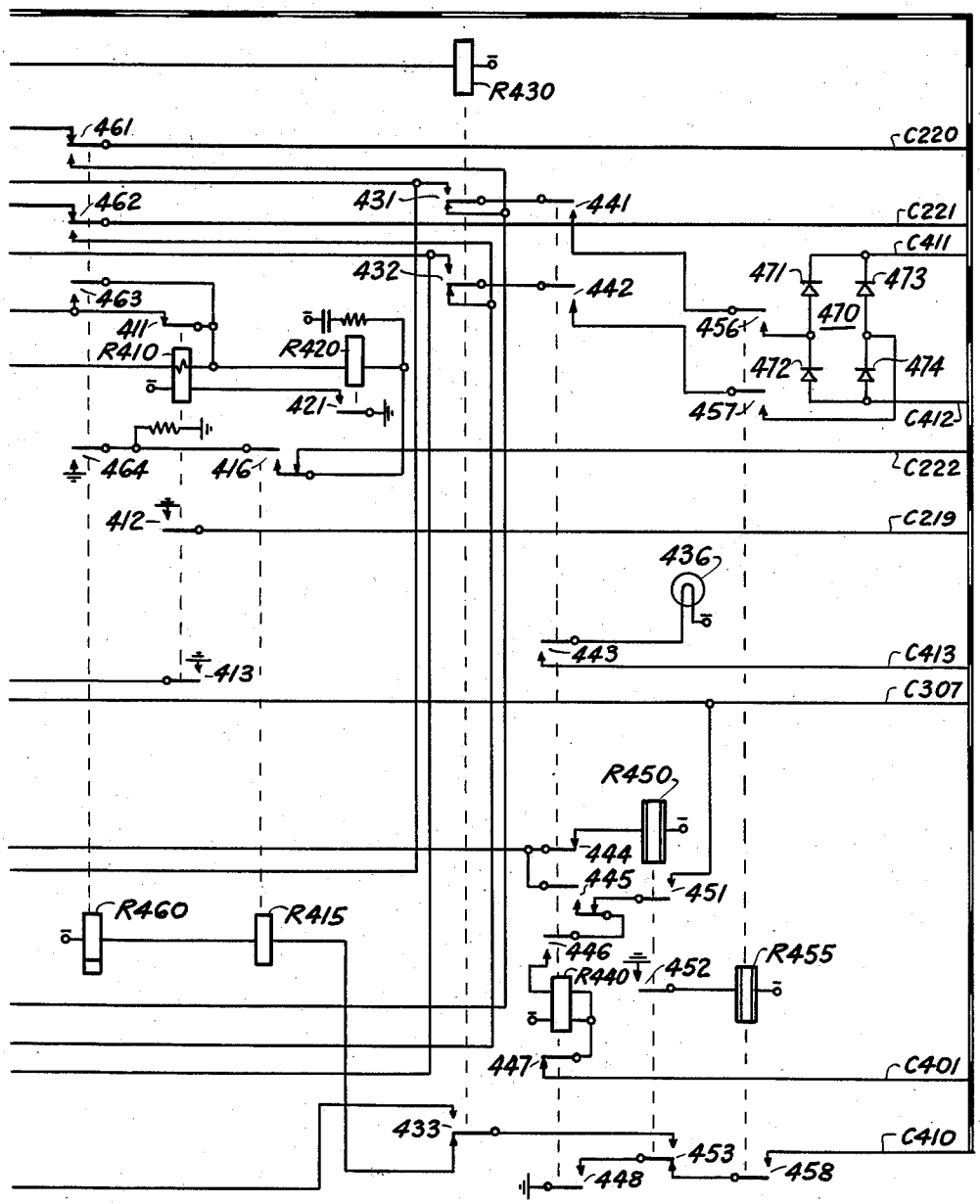

The operator then depresses a start button in keyset 260 placing ground on lead C401 to relay R440 (Fig. 4). Relay R440 operates, closing its "X" contacts 446 only and shorts its upper winding through closed contacts 445, 451, 334 to ground at contact C413. After the start button has been depressed and released, ground is removed from lead C401 removing the short from the upper winding of relay R440. Relay R440 then operates completely and locks to ground over a path through contacts 446, 445, 312 and 335 and lead C245 to ground in the operator's telephone circuit 250. At contacts 447 lead C401 is thereby further opened. At contacts 448 ground is closed through contacts 453 and 433 to relays R415 and R460. Both these relays operate. At contacts 464 ground is placed through contacts 416 to lead C222 replacing the battery which had previously been present on this, the sleeve lead of the cord circuit plug 202. The action of this ground will be explained subsequently. At contacts 461 and 462, the trunk discriminating circuit is closed from leads C505 and C502 in trunk circuit Fig. 5 to the discriminating relay R760 as follows: trunk tip lead C505, jack 501, plug 202, cord circuit tip lead C220, closed contacts 461, 431, 441, 456, rectifier 471, lead C411, relay R760, contacts 628, lead C412, rectifier 474, contacts 457, 442, 432, 462, lead C221, plug 202, jack 501 to lead C502.

Also on operation of relay R440; at contacts 444 the operate path to relay R450 is opened. Relay R450 having a slug, is slow to release and remains operated while relay R760 tests the trunk.

If the operator had desired the distant exchange "C" and plugged into jack 501', the operation of the trunk circuit 5A would be identical to that of Fig. 5 as described to this point. The relays R510', R520' and R530' would have operated in this instance.

*Finding an idle D.C. sender*

On depression of the start button the sleeve lead in the cord circuit is momentarily grounded to contact 464 as previously mentioned. Relay R510' in Fig. 5A restores, closing its contacts 511' and ground is placed through contacts 521' over the tip lead C505' to one end of the upper winding of relay R760 over the previously described path. Resistance battery from relay R530' through contacts 512', 524' and lead C502' is thereby connected to the other side of upper winding #1 of relay R760. During this momentary interval, relay R760 operates thereby marking the called exchange as one requiring D.C. pulsing. At "X" contacts 761, relay R760 locks itself to the ground at contacts 629, and contacts 764 are closed to wiper 772 level of rotary switch S770. On this bank level, all multi-frequency sender representations are grounded out so that only D.C. sender may be accessed from this level.

Relay R450 whose operate path had previously been opened, releases and opens the operate path to relays R415 and R460. Relay R415 releases, reclosing its contacts 416 to place battery on sleeve lead C222 and thereby reoperate relay R510'. Relay R460 is slow-to-release and holds operated for a delay period during which the trunk testing is completed.

The function of the chain relay R790 is to permit the sender finder switch to search for only one idle sender at a time. If the request for a sender is next in line, battery is returned on lead C741 to relay R730, contacts 747, lead C307, contacts 334, contacts 413 and ground. Relay R730 operates and closes its contacts 733 connecting relay R750 to the ground on lead C307.

If the wiper 772 of the sender finder switch S770 is resting on a busy sender when relay R730 has operated, a ground is received from the busy sender on wiper 772 over a path through contacts 764, 753, 732, 796 to the motor magnet M795 thereby energizing the motor magnet. The ground wiper 772 also shunts out relay R750 and keeps it from operating. Interrupter springs 796 open, the motor magnet restores and the switch S770 advances its wipers one step. This stepping continues self-interrupted until an absence of ground appears on the bank contacts of wiper 772.

When an idle sender is found, no ground appears on wiper 772; motor magnet M795 does not operate and the absence of ground removes the shunt from relay R750. Relay A750 operates and locks to ground over the path from battery through both windings of relay R750 to contacts 733, lead C307 and ground. Relay R750 by its operations stops further operation of motor magnet M795 at contacts 753. Ground is closed from contacts 753 to wiper 772 and lead C720 to seize the idle D.C. register-sender 700 which has been found. At contacts 755 ground is closed to relay R710 through contacts 723 and relay R740 and through contact 667. Ground at contacts 765 is closed over the path through contacts 653, 635, 758, lead 259 to the supervisory lamp 270 and battery. Relay R740 operates, opening the operate path of relay R730 at contacts 747. Also on operation, leads C253—C256 are closed to the register-sender. Lead C252 is closed to relay R720. Relay R710 then operates and relay R730 releases. The action of D.C. sending is well known in the art and need not be described for this invention.

*Seizing an idle M.F. sender*

On depression of the operator's start button, the sleeve lead in the cord circuit is again grounded momentarily. Relay R510 restores. Ground is sent from contacts 511 through contacts 521 and the tip lead of C505 to relay R760 over the previously described path; however no battery appears at contacts 512 and the operate path to relay R760, the descriminating relay, is held open and this relay cannot operate. Since no switching operation takes place at contacts 764 the sender searching function takes place on wiper 773 of sender finder switch S770. At the level on which wiper 773 searches, all D.C. senders are grounded so that no D.C. sender can be accessed from this level. In a manner similar to that of finding an idle D.C. sender, when busy ground appears on wiper 773 to indicate a busy sender, magnet M795 operates, shunting out relay R750 and self-interruptedly steps switch S770 once. When wiper 773 finds an idle sender on its level of switch S770 the following steps occur: absence of ground on wiper 773 allows relay R750 to operate on the ground path from lead C307 as previously described. Contacts 753 are closed putting ground through contacts 764, wiper 773, lead C710, contacts 803 (Fig. 8), to relay R810 and battery. Over the wiper 774 of sender finder switch S770 an operate path is established for relay R875. This path is as follows: ground, relay R875, lead C709, wiper 774, contacts 763, 653, 635, 758, lead C259, lamp 270 to battery. The resistance in the circuit is such that lamp 270 does not light. Relays R810 and R875 operate. At contacts 877, relay R880 is closed to ground. At contacts 812 ground is closed through contacts 818 and 822 to relay R825. At contacts 814 ground is closed to start the sender pilot interrupter relay R645. Relay R880 then operates as does relay R825. At contacts 827 an operate path is closed for relay R820. Relay R820 operates and locks itself to ground at contacts 812. At contacts 822 the operate path of relay R825 is opened. At contacts 826 ground has been closed through relay R815 to lead C708, wiper 775, contacts 751, 722, and relay R670 to battery. Relay R815 does not operate on this high resistance battery. Relay R670 operates, closing the tip, ring and sleeve leads C701, C702 and C703 through contacts 671, 672 and 673 to leads C228, C229, and C230 thus closing these leads from sender 800 through sender-control 600, operators position circuit 300 and cord circuit 200, to trunk 500.

Again relay R450 whose operate path has previously been opened restores after a time delay. At contacts 416 battery current is placed on sleeve lead C222 to relay R510 of Fig. 5. Relay R510 reoperates switching its low resistance winding on to the sleeve lead C504. After a further time delay R460 releases, opening the testing circuit to relay R760.

Low resistance ground from jack 501 is returned through leads C503, C504 and C230, contacts 673, wiper 780, lead C703, relay R830, relay R885 and battery. Relay R830 operates closing its contacts 831 to relay R840. Relay R885 operates closing its contacts 886 to supply a holding ground from contacts 883, through contacts 886, relay R815 lead C708, wiper 775, contacts 751, 722 and relay R670 to battery. In this manner relay R670 is locked to the sender circuit during the digit sending sequence. After a time delay, slow-to-release relay R825 whose operate path had been previously opened at contacts 822 restores, closing contacts 823 and placing battery from relay R870 through contacts 857, 823, 813 to ground. Relay R870 operates and at contacts 874, relay R850 is closed to the operating ground of relay R870. Relay R850 operates and at contacts 856 locks itself to its operate ground. At contacts 857 the operate path of relay R870 is opened. At contacts 851 and 852, multiple frequency leads C1100 and C1700 are closed to the repeat coil 809. These impulses are transmitted on leads C701 and C702 through the sender control 600 to lead C228 and C229, the tip and ring leads and ultimately to the distant exchange equipment over an obvious path. This splash of these two frequencies are sent to condition the distant exchange equipment for the pulses to come. After a time delay, slow-to-release relay R870 restores and opens contacts 871 and 872 removing the 1100 and 1700 cycle frequencies from the line. The duration of these pulses is determined by the release time of relay R870 and should last about 55 milliseconds.

In closing contacts 873, ground is closed to the sender pilot lamp over the path from ground at contacts 811 through contacts 891, 873, 854, 837, 879, the low resistance winding of relay R875, lead C709, wiper C774, contacts 763, 653, 635, 758, lead 259 to lamp 270 and battery. This low resistance ground allows lamp 270 to fire giving the operator a start sending signal. Relay R875 remains operated over its low resistance winding. At this time the tip and ring leads have been connected forward to the distant exchange and back toward the multi-frequency distribution circuit 990 to an open condition at the contacts of relays R910, R920, R930 and R940, the individual digit control relays.

Relays operated prior to further operation include R360, R380, R410, R420, R440, R510, R520, R530, R560, R570, R610, R620, R670, R710, R740, R750, R810, R820, R830, R840, R850, R875, R880 and R885.

*Multi-Frequency Sending*

At this stage of the explanation it may be worthwhile to list the Multi-Frequency code as generally used:

| No. | Leads In Sender | Frequencies | Relays For WXYZ Code |
|---|---|---|---|
| 1 | C704, C705 | 700 and 900 | WX R910, R920 |
| 2 | C704, C706 | 700 and 1,100 | WY R910, R930 |
| 3 | C704, C707 | 900 and 1,100 | WZ R910, R940 |
| 4 | C705, C706 | 700 and 1,300 | XY R920, R930 |
| 5 | C705, C707 | 900 and 1,300 | XZ R920, R940 |
| 6 | C706, C707 | 1,100 and 1,300 | YX R930, R940 |
| 7 | C704 | 700 and 1,500 | WC R910, R950 |
| 8 | C705 | 900 and 1,500 | XC R920, R950 |
| 9 | C706 | 1,100 and 1,500 | YC R930, R950 |
| 0 | C707 | 1,300 and 1,500 | ZC R940, R950 |
| KP | (Start) | 1,100 and 1,700 | |
| ST | (End) | 1,500 and 1,700 | |

It should be noted from the table that multi-frequency coding requires a slight departure from the straight WXYZ code usually used. In the standard WXYZ code four relays such as R910, R920, R930 and R940 are operated directly by the keyset, and digits 7, 8, 9, and 0 are represented by a single relay each. In the multifrequency pulsing systems since each digit must be represented by two frequencies, a fifth relay R950 must also be operated on digits 7, 8, 9 and 0 to supply the second frequency to complete the digital representation.

It should be noted that the sender circuit has been so designed that two of the code relays R910, R920, R930, R940 and R950 must be operated in order to transmit any frequency to the line. When only one relay is operated, no impulse whatever is transmitted to the line.

When the operator is ready to extend a call and has received the sender ready signal on lamp 270, she keys the digits to be sent. As an example, assume that the first digit to be keyed is the digit 6. Ground is placed momentarily on leads C255 and C256 at the keyset 260. Ground on C255 operates relay R930 over the path from ground, lead C255, contacts 743, wiper 777, lead C706 to relay R930 and battery. A parallel ground from lead C256 causes relay R940 to operate. A circuit is closed to relay R890 over a path from battery, to the upper winding of relay R890 through contacts 929, 939, 927 and 916 to ground. Relay R890 operates. Relays R930 and R940 release when their momentary operate ground is removed. Relay R890 on its operation closes lead C805 to lead C709. This action places ground pulses at the rate of ten pulses per second to lead C709, wiper 774, contacts 763, 653, 635, 758, lead C259 and to lamp 270 and the lamp flickers at this rate. The 10 pulse per second ground is received over lead C805 and contacts C649. As may be readily seen, relays R647 and R645 pulse one another upon application of ground on lead C806 which occurs when the sender is seized. These ground pulses however are only transmitted to the sender lamp 270 during the short interval of a pulse being sent as shown by the operation of relay R890. The actual time interval during which a multi-frequency pulse is being transmitted is on the order of approximately 25 milliseconds.

The operator then keys each of the remaining digits and the signals are transmitted to the distant exchange in the same general manner.

*Release*

After the last digit has been keyed, the operator depresses the keyset button grounding lead C258 momentarily. Relay R660 operates its upper winding over a path from this ground through contacts 627, 748, 734 to battery. Relay R660 then locks itself to ground through contacts 661 and 755.

At contacts 667 the operate path to relay R740 is opened. Relay R740 restores and opens leads C252, C253, C254 and C255 to the ketset to prevent further keying. At contacts 746 the hold path to relay R620 is opened. Relay R620 restores preparatory to the release of the sender control. Relay R660, R670, R710 and R720 remain operated under the control of the impulse sender while relays R645 and R647 continue to pulse.

During this period and after all stored digits have been sent, the following action begins. Operation of relay R660 closes contacts 668 placing direct ground through contacts 763 wiper 774, lead C709 to relay R875 and ground causing this relay to restore. A path is closed from the multifrequency distribution circuit 990 on leads C1700 and C1500. These paths are as follows: C1700, contacts 881, 876, 871, 861, 851 to the repeat coil 809; and C1500, contacts 882, 878, 872, 862, 852, to the same repeat coil. From the repeat coil these frequencies are transmitted on lead C701 and C702 through the sender control 600 and cord circuit 200 to the outgoing trunk leads and the distant exchange. These signals constitutes the end of pulsing signal to the distant office. The duration of these signals is determined by the release time of relay R880 whose operate path has been opened at contacts 877 concurrently with the start of the signal. This duration is on the order of 27 milliseconds.

Relay R880 restores opening the "end of pulsing" signal at contacts 881 and 882. At contacts 883, the relay R670 holding ground path previously described is opened. Relay R670 releases. At contacts 677, the holding ground is removed from relay R750. At contacts 673 the operate path to relays R830 and R885 is opened. Relay R750 releases and restores its contacts 753, thereby opening the operate path to relay R810. Relay R810, R830 and R885 release. At contacts 813 the holding ground for relay R850 is opened. At contacts 812 the hold path to relay R820 is opened. At contacts 814 ground is removed from the pulsing relay R645. At contacts 831 the operate path of relay R840 is opened. Relays R820, R840 and R850 restore returning the sender circuit to its normal state.

On the restoration of relay R750, ground is closed at contacts 755 through contacts 713 to energize motor magnet M795. Also at contacts 755, ground is removed from the operate path to relay R660 and R710. Relay R660 releases removing the holding ground from relay R610. After a time delay slow-to-release relay R710 restores opening the previously mentioned operate path to motor magnet M795. Switch S770 steps once so that a succeeding call will seize the next sender, if available. The sender control circuit is thereby restored to normal.

During this period and after the final signal has been given, the operator releases the talk button, this releases the relays held operated in the position circuit 300 and frees the position circuit for other calls.

*Error*

If the operator has made an error in keying the called number, she closes the error button at the ketset momentarily placing ground on lead C252 through contacts 745 to relay R720. Relay R720 operates and locks through its own contacts 721 to ground at contacts 711. At contacts 723 the operate path to slow-to-release relay R710 is opened. At contacts 722, low resistance battery from the upper winding of relay R670 is placed on wiper 775 and lead C708 over a path through contacts 676, 712, 722, 751, wiper 775, lead C708, the upper winding of relay R815 through contacts 886 and 883 to ground. Relay R815 operates on this low resistance battery.

At contacts 818, the operate path to relay R820 is opened. At contacts 817 a path is closed to relay R835 via contacts 843 and 813 to ground. At contacts 816, the low resistance noninductive winding of relay R810 is closed through the inductor 805 of repeat coil 809, lead C702, wiper 781, contacts 672 and lead C229 to the tip lead C505 in the trunk circuit. Relay R835 operates locking itself to ground through contacts 836, 873, 891 to ground at contacts 811. At contacts 837, the pulsing ground from relays R645 and R647 on lead C805 is connected through the lower winding of relay R875, contacts 884 to lead C709 and wiper 774 over a previously described path to signal lamp 270. Lamp 270 then follows the pulses of relays R645 and R647.

In the trunk circuit 500 the low resistance battery from relay R810 on lead C505 operates relay R545 over a path through contacts 521, 511, 522, inductor 536, resistor 557, the upper winding of relay R545, contacts 525 and 563 to ground. Relay R545 operates placing direct ground on relay R550. At contacts 547 the lock-operated circuit of relay R570 is opened to ground at contacts 562. Relay R570 restores. The ground on sleeve lead C504 is changed from low resistance to high resistance by the opening of contacts 572. The ground originates at lead C503 in the jack and is transferred from the upper or low resistance winding of relay R510 to the lower or high resistance winding of the same relay. Relay R550 then operates opening contacts 551 and 552 thus opening leads C511 and C512 to the distant exchange. Lead C518 is changed from its seized to its normal state at contacts 553.

The high resistance ground from the trunk circuit 500 over sleeve lead C504 is transmitted to lead C703 causing relays R830 and R885 to release. Release of relay R830 opens relay R840 causing it also to restore. Release of relay R840 opens the original operate path and also the hold path to relay R815. Also on release of relay R840, the multiple holding ground to relays R870 and R835 is opened. Relay R815 restores opening the low resistance battery on lead C702 to the tip lead C505 and also closing ground to relay R825. Relay R835 restores. Relay R870 being slow-to-release holds momentarily. Relay R825 operates and closes ground to slow-to-operate relay R820 and returns relay R815 and its lead C708 to a grounded condition.

In the trunk circuit during this period, a ground signal is received from the distant exchange on lead C519 in response to the change of condition on lead C518. Relay R575 operates and closes a locking circuit to relay R545 over the path from the lower winding of relay R545, contacts 546, 577, 562 to ground. The distant office equipment then releases and removes ground from lead C519. Relay R575 restores and opens the holding path to R545. Relay R545 restores opening the path to R550. R550 restores closing the trunk loop to the distant office, removing the line terminating impedance from the trunk and changing lead C518 from its normal to its seized state. The previously mentioned low resistance ground is closed at contacts 578 to signal on the sleeve lead C504.

On receipt of this low resistance ground, relay R830 reoperates. Relay R830 closes the path to relay R840 which then operates. On operation relay R840 closes a holding ground to relay R870 over a previously mentioned path and also removes the shunt across relay R885 at contacts 841 allowing relay R885 to operate. A holding ground to lead C708 is closed at contacts 886. Relay R820 then operates and locks itself operated while opening the path to relay R825 and closing the path to relay R850. Relay R825 restores and relay R850 operates. R850 on operation causes the 1100 cycle and 1700 signal frequencies to be sent to the distant exchange, and further opens relay R870. Relay R870 restores removing the multi-frequency start signals and closes low resistance ground to light the sender pilot lamp 270 continuously. As the talk key has not been released, relay R750 remains, holding the impulse sender. The operator may key up the called number again using the same sender.

*Miscellaneous*

In viewing the figures and the specification it will appear obvious that the operation of many relays and components have not been mentioned. In general there are incorporated into the apparatus many features incidental to the main operation which are generally known. These features include "tip busy test," pad control "all sender busy" signal and other supervisory functions. It is felt that since these features are generally known and can be seen readily by those skilled in the art, these features would merely tend to unduly lengthen the explanation unnecessarily.

What is claimed is:

1. In a telephone system, a toll board having a plurality of interconnecting circuits, said circuits comprising a plurality of register-senders capable of transmitting a first type of pulse and a plurality of register-senders capable of transmitting a second type of pulse, all said register-senders accessible only through a sender selecting means at said toll board, said sender selecting means including a switch having a plurality of contacts, a plurality of trunks receptive to said first type of pulse and trunks receptive to said second type of pulse, each of said types of trunks accessible through a separate group of contacts on said switch, manual means at said toll board for seizing one of said trunks, trunk testing means in said toll board circuits, said testing means operable on seizure of a trunk receptive to pulses on said first type to cause said switch to access a sender capable of transmitting said first type of pulse, said testing means on seizure of a trunk of said second type causing said switch to access a register-sender of said second type.

2. In a telephone toll board, a common pool of register senders, said pool comprising senders for transmitting pulses of multi-frequency type and senders for transmitting interrupted direct current pulses, a sender control circuit having two access leads, each of said leads terminating on a wiper individual to a level of a rotary switch having a plurality of levels, a first level of said rotary switch having access to said multi-frequency type senders, a second level of said rotary switch having access to said direct current type senders, a plurality of trunks receptive to direct current pulses and a plurality of trunks receptive to multi-frequency pulses, manual means at said toll board for connecting to a trunk, means in said multi-frequency receptive trunks operable on connection by said manual means for causing said first level wiper to search for a register-sender of the multi-frequency pulse type, means in said direct current receptive trunks operable on connection by said manual means for causing said second level wiper to search for a register-sender of the direct-current type.

3. In a telephone toll board, a common pool of register-senders, said pool comprising senders for transmitting pulses of the multi-frequency type and senders for transmitting interrupted direct current pulses, a sender control circuit having two access leads, each of said leads terminating on a wiper individual to a level of a rotary switch having a plurality of levels, a first level of said rotary switch having access to said multi-frequency type senders, a second level of said rotary switch having access to said direct current type senders, a plurality of trunks receptive to direct current pulses and a plurality of trunks receptive to multi-frequency pulses, manual means at said toll board for connecting to a trunk, means in said multi-frequency receptive trunks operable on connection by said manual means for causing said first level wiper to search for a register-sender of the multi-frequency pulse type, means in said direct current receptive trunks operable on connection by said manual means for causing said second level wiper to search for a register-sender of the direct-current type, further means in said sender control operated when said searching wipers gain access to an idle sender to connect the remaining levels to a circuit through a sender control to transmit pulses through said sender control to said trunk.

4. In a telephone system, a plurality of interconnected offices including a first, a second, and a third office, switching apparatus in said offices controllable from said first office, the switching apparatus in said second and third offices each responsive to a different type of control pulse from said first office, means at said first office for connecting to one of said offices, testing means at said first office for indicating the type of response required by the connected office, senders at said first office capable of providing control pulses of each of the required types, each of said senders accessible over a separate level of a rotary switch at said first office, means responsive to the indication from said testing means to provide access to the level of the rotary switch and thereby seize a sender to provide the type of control pulses required by the connected office, said responsive means also blocking from access other sender levels of said rotary switch.

5. A telephone toll board having a plurality of trunks, each of said trunks individually connected to a distant exchange having switching apparatus controllable from said toll board, one of said distant exchanges requiring interrupted dial pulses, another of said exchanges requiring multi-frequency pulses, register senders of a first type for providing interrupted dial pulses and register-senders of a second type for providing multi-frequency pulses, each of said types of register senders accessible through a separate level of a rotary switch, means at said toll board for seizing one of said trunks, means in said seized trunk for causing said rotary switch to hunt on the level having access to the type of sender required by the seized trunk, means associated with said rotary switch for seizing an idle sender of the required type, further levels of said rotary switch for completing a connection of the seized sender to the seized trunk.

References Cited in the file of this patent

UNITED STATES PATENTS

| | | |
|---|---|---|
| 2,636,947 | Michael | Apr. 28, 1952 |
| 2,281,636 | Strickler | May 5, 1932 |